Nov. 4, 1958     W. J. COTTON     2,858,647
ARTICLE OF MANUFACTURE FOR PLANTING IN PULP CONTAINERS
Filed Oct. 14, 1954

INVENTOR.
WILLIAM J. COTTON
BY
Wheeler, Wheeler & Wheeler
ATTORNEYS

United States Patent Office 2,858,647
Patented Nov. 4, 1958

2,858,647
ARTICLE OF MANUFACTURE FOR PLANTING IN PULP CONTAINERS

William J. Cotton, Milwaukee, Wis., assignor to Keiding Paper Products Company, Milwaukee, Wis., a corporation of Wisconsin Application October 14, 1954, Serial No. 462,176

1 Claim. (Cl. 47—37)

This invention relates to an article of manufacture for planting in pulp containers.

Molded pulp containers have been used by florists both as vases for cut flowers and as jardinieres in which potted plants have been set for display. In the latter use, the pot has been entirely free within the jardiniere, the only function of the latter being to conceal the clay pot.

The present invention is based on the discovery that a pulp container has great value as a substitute for the clay pot itself. Not only may plants be grown advantageously with improved root aeration in such a pot but, in the case of plants which are intended to be grown in the ground, the pot becomes not merely a container in which the plant may be started, but it becomes a gage which, even in the case of the least informed customer, will indicate the proper planting depth and will enable him to set the still potted plant into the ground where the undisturbed roots will ultimately grow out into the surrounding soil through the decomposing pulp receptacle.

There are many purposes for which paper pulp, the conventional material used in the molding of such receptacles, is entirely satisfactory. However, I have found special advantages in the use of pulp made from bagasse, the sugar cane refuse left after sugar has been extracted. There appears to be a residual material in the bagasse which stimulates plant growth.

Without any treatment whatever, a paper pulp container in which a plant is growing will last for a long period in the open air, but will disintegrate rapidly in the ground. This rapid disintegration is a desirable factor in many instances. However, there are other cases when it is desirable to embed the pot in the earth for a given period, and to lift it intact at the end of such period. I have found that a pulp container in which copper naphthenate has been added to the pulp will resist decomposition even when embedded in the soil. Copper naphthenate is available commercially in solution. For the purpose hereof it is added to the pulp in the beater in the proportion of 12½ pounds of an 8% solution to 100 pounds of paper pulp. The equivalent is 1 pound of copper naphthenate dry weight, or about 1% of the pulp by weight. The copper naphthenate appears to be adsorbed on the fiber of the pulp. The proportions are believed not to be critical and it may be that they can be reduced materially below the stated proportion used in practice.

Copper naphthenate is commercially available both in aqueous solution and in an organic liquid. In the latter form it is readily dissolved in molten wax. When the aqueous preparation is added to molten wax, the water boils off instantly leaving the naphthenate dissolved in the wax. Accordingly, another method of treating the pulp container is to incorporate the copper naphthenate in molten parafin and dip the container in the melted parafin in which the copper naphthenate is dissolved. Still another method is to use ordinary wax paper scrap in the manufacture of the pulp and to add the copper naphthenate in the pulper, in which case it becomes dissolved in the wax, which coats the fibers of the pulp.

The pot or container 1, regardless of the composition of the pulp, has had copper naphthenate added to increase the life of the pot when imbedded in soil. As above stated, the use of the copper naphthenate is an optional feature, from the standpoint of the method claimed, since it may be desirable in many instances that the pulp container decompose rapidly.

Figure 1:
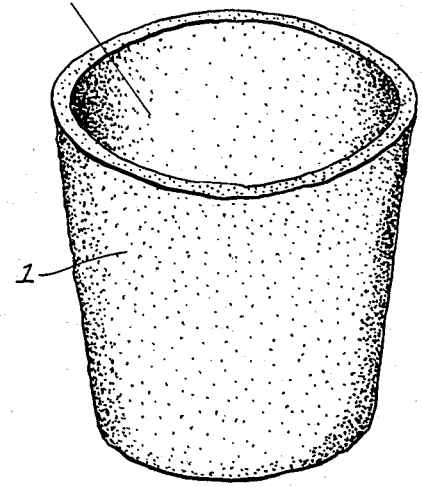
Fig. 1 shows in perspective a pulp container in which presence of copper naphthenate is indicated by a legend.
Figure 2:
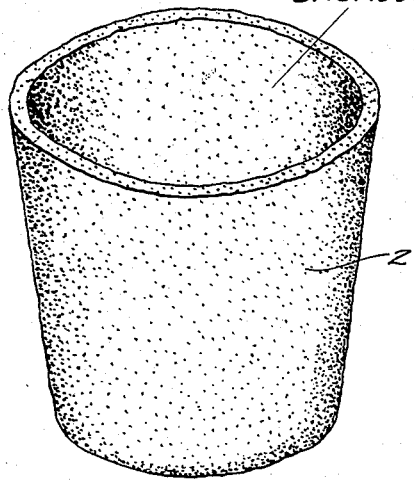
Fig. 2 is a view similar to Fig. 1 showing a pulp container in which the pulp comprises bagasse.

In Fig. 2, the container, designated by character reference 2, comprises bagasse pulp, at least in part. Some of the advantages of bagasse may be achieved when the bagasse is mixed with paper to comprise the pulp used to mold such containers. It will be understood that in the container 2 the use of the copper naphthenate is optional.

Figures 3, 4:
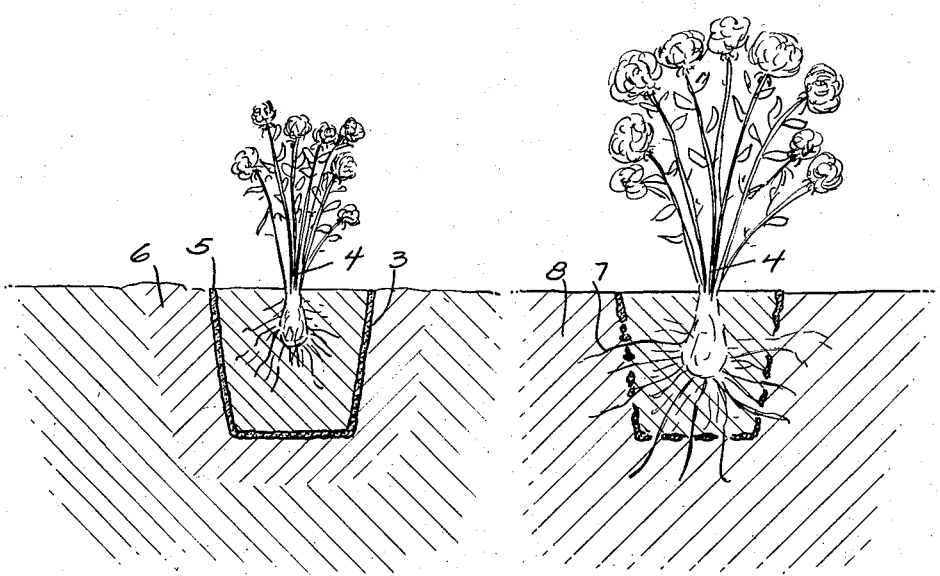
Fig. 3 is a diagrammatic view in section, illustrating the step of planting a growing plant, complete with pulp container.
Fig. 4 is a view similar to Fig. 3 showing the roots of the plant emerging from the disintegrating container.

From a method standpoint it has already been indicated that by planting the pot 3, along with the plant 4 growing in the pot, it is not only possible to avoid disturbing the roots of the growing plant, but it is possible to indicate to the operator the precise depth at which the growing plant should be set. All that is necessary is to leave the rim 5 of the pot 3 flush with the surface at which the ground 6 is leveled following the transplanting operation. The pot may be paper pulp or bagasse pulp. In either case copper naphthenate will be incorporated in the pot only in the event that it is desired to keep the plant potted until it can be lifted at some subsequent date. In a routine transplating operation the copper naphthenate is omitted and the pot speedily decays and permits the roots 7 of the transplanted plant to grow out into the surrounding soil 8 as shown in Fig. 4.

I claim:

As a new article of manufacture, a planting pot comprising bagasse pulp having individual bagasse fibers coated with wax in which copper naphthenate has been dissolved.

References Cited in the file of this patent

UNITED STATES PATENTS

| | | |
|---|---|---|
| 1,776,016 | Alvord | Sept. 16, 1930 |
| 1,978,102 | Clapp | Oct. 23, 1934 |
| 2,047,975 | Liberthson | July 21, 1936 |
| 2,129,190 | Leatherman | Sept. 6, 1938 |
| 2,496,566 | Szwarc | Feb. 7, 1950 |
| 2,688,209 | Adams | Sept. 7, 1954 |

FOREIGN PATENTS

| | | |
|---|---|---|
| 514,733 | Belgium | Oct. 31, 1952 |
| 594,305 | Germany | July 3, 1934 |

OTHER REFERENCES

Chemical Abstracts, vol. 40, col. 5526 (1946), article, "Save Your Wood With Cuprinol."

Chemical Abstracts, vol. 44, col. 6626 (1950), article, "Water-Vapor-Resistant Coated Paper."